United States Patent Office 2,943,021
Patented June 28, 1960

2,943,021
METHOD FOR RETAINING IMMEDIATE DENTURES

Eugene G. Landberg, 3322 Huntoon, Topeka, Kans.

No Drawing. Filed July 28, 1958, Ser. No. 751,122

6 Claims. (Cl. 167—60)

This invention relates to an improved medicinal composition adapted for use on immediate and new dentures, as well as to a novel method of treating the patient's gums after extraction of teeth so as to alleviate pain caused by such extraction or by the prosthetic appliance itself replacing the teeth and also to promote healing of the sore areas of the afflicted gums.

Eduction of the general public in recent years to the importance of dental hygiene in over-all health, and in particular to the need for removing diseased and abscessed teeth, has resulted in a significant increase in the acceptance and utilization of artificial dentures. For reasons of convenience and efficiency, most dentists resort to multiple extraction procedures in order that the artificial denture may be substituted for the natural teeth in a minimum of time. Oftentimes extraction of several or all of the patient's teeth at one time is necessary for health reasons, inasmuch as diseased teeth can cause maladies if not removed as soon as practical.

However, multiple extractions have created problems incident to pulling of teeth because of the fact that the entire area of the gums is sore and most usually must be sutured after extraction to prevent excessive bleeding and the like. It has been the usual practice to permit the gums to substantially heal before the prosthetic device is placed in the mouth, but inasmuch as this takes from four to six weeks, many patients object to having to go without teeth for this extended period of time and thus, insist that the artificial teeth be placed in their mouth as soon as possible.

In order to meet this demand for placement of the dentures in the mouth as soon after extraction as medically practical, dental research workers have found that the artificial appliances may be placed in the patient's mouth immediately after extraction without deleterious effects on the gums or increasing the hazard of infection. Prosthetic appliances inserted into the patient's mouth as soon as the teeth have been pulled are known in the profession as "immediate dentures." Under this practice, an impression of the patient's gums is taken before the teeth are pulled, whereupon the nerves leading to the teeth to be extracted are blocked with the usual needle-injected, deadening drugs and the teeth are extracted, usually in multiple numbers. Although some practitioners hesitate to extract all of the teeth from both upper and lower jaws at the same time, many dentists have found this to be a satisfactory procedure. In any event, the gums are sutured after extraction of the teeth to prevent excessive loss of blood and to lessen the healing time required to return the same to normal condition. The immediate denture has already been prepared from the impression initially taken and it is inserted in the patient's mouth after wetting with water as soon as the gums have been sutured and cleaned up.

Experience has shown that the immediate denture should be left in the mouth substantially continuously during the first 72-hour period subsequent to extraction in order to prevent excessive swelling of the gums and to insure healing of the same in the proper contour. If the denture is taken out for an extended period of time during the first 72 hours, the gums swell and it is difficult to reinsert the denture.

It thus is apparent that in order for the immediate dentures to fit properly, the same should be retained in the mouth for an initial predetermined period to contain swelling of the gums. Maintaining the artificial dentures in the mouth during the first 72 hours is usually a painful experience, however, because of the fact that the alveolar ridges of the gums are very tender and as soon as the Novocain or other deadening drug wears off, the shattered nerves produce a considerable amount of pain. In order to alleviate this pain, dentists have utilized certain ointments containing an antiseptic and a mild anesthetic, but these ointments have not been satisfactory because the same are generally grainy in texture and tend to spread over the proximal alveolar ridge, thereby decreasing the concentration of active ingredients applied to the sore areas. Furthermore, the ointments are diluted by fluids contained in the mouth and thus rapidly lose their therapeutic value. Even under these adverse reactions, many persons still demand that the doctor prepare immediate dentures for them because of the necessity of their having teeth at all times for social and professional reasons.

Similar problems exist with the utilization of what are generally termed "new dentures," i.e. those inserted four to six weeks after extraction of the teeth and subsequent to substantial healing of the alveolar ridges of the gums. These new dentures oftentimes are appliances made from an impression taken after the extended period of time during which the gums should have healed. However, new dentures do not always fit properly because of small changes which may occur in the configuration of the lingual, buccal and/or alveolar ridge surfaces of the gums between the time of taking of the impression and insertion of the denture into the patient's mouth. The dentures themselves do not always correspond exactly with the initial impression taken and even after a four to six weeks period following the date of extraction, there often are relatively small areas of the gums which are still sensitive to pressure and the patient finds it extremely difficult to maintain the artificial appliances in his mouth. Again, in this type of situation, certain practitioners have attempted to alleviate the pain by utilization of various types of ointments containing mild anesthetics to deaden the alveolar ridge areas of the gums, but the ointments tended to spread out very thinly over the gums and thereby operated to desensitize the entire surfaces of the gums to which the medicament was applied and were of relatively short duration in effectiveness. Objections to the use of such ointments were voiced by a majority of the patients because their entire alveolar ridges were completely desensitized by the ointment and furthermore, the pain-deadening action was not long-lived enough to be of practical value in the absence of removing the denture from the mouth.

It is, therefore, the most important object of this invention to provide a medicinal composition for use on both immediate and new dentures, adapted for alleviating pain associated with sore areas of the gums and also especially formulated to promote healing and prevent infection of the gums.

It is a further important object of the invention to provide a denture composition as referred to above which permits treatment of sore areas of a patient's gums by application of a single composite, topical preparation including as active ingredients, mutually cooperable, medically effective, non-toxic proportions of an anesthetic, an analgesic, an antiseptic, a bactericidal and a healing agent incorporated into a readily absorbent carrier material characterized by serving as an adhesive to maintain the dentures in firm engagement with the patient's gums, providing a cushion between the dentures and the gums and substantially resistant to spreading under moist conditions, whereby maximum patient comfort is obtained and the sore areas of the gums are subject to all of the active ingredients at their maximum concentrations.

Also an important object of the instant invention is to provide a composition as described wherein the absorbent carrier material, and which is resistant to spreading under moist conditions, is in the nature of a non-toxic, inert, vegetable gum having a high affinity for water and which has the unique property of maintaining the active ingredients incorporated therein in contacting relationship with the sore areas of the gums.

Also an important aim is to provide a composition for use on immediate and new dentures which includes a local anesthetic that acts quickly and is long lasting so that the pain alleviating characteristics of the composition extend for a prolonged period of time, thus negating the necessity of the patient removing the denture from his mouth at relatively short intervals. In this connection, a further aim is to provide a composition having an analgesic, an antiseptic, a bactericidal and a healing agent incorporated into the non-spreading, adhesive type carrier which mutually cooperate with the anesthetics to provide maximum patient comfort over an extended period of time and with a minimum of self-treatment by the patient being necessary.

Another important object of the present invention is to provide a method of treating individual sore spots on gums sensitive to pressure of new dentures and which permits such sore areas to be treated without desensitizing the entire areas of the patient's gums.

Also an important object is to provide a method of treating a patient's gums subsequent to multiple tooth extraction for permitting dentures to be immediately placed in the mouth without the extreme pain and discomfort normally associated with immediate dentures.

Other important objects of the invention appear hereinafter and salient features will be pointed out as the following specification progresses.

As heretofore explained, dentists have experienced difficulty in treating sore areas of gums caused by extraction of teeth from the same and in particular, areas of the gums which are sensitive to pressure caused by prosethetic devices replacing the extracted teeth. The present denture composition which is adapted for use on both immediate and new dentures to alleviate pain and also promote healing of the tissues of the gums, includes as active ingredients, mutually cooperable, medically effective, non-toxic proportions of a relatively fast-acting, long lasting anesthetic, an analgesic, an antiseptic, a bactericidal and a healing agent incorporated into a relatively absorbent carrier characterized by serving as an adhesive to maintain the dentures in firm engagement with the patient's gums, providing a cushion between the dentures and the gums, and substantially resistant to spreading under moist conditions to thereby assure that the areas of the gums to which the preparation is applied are subjected to all of the active ingredients at their maximum concentrations. By utilizing a composition as described on the denture, the necessary phases of patient comfort are met and a complete, effective and convenient method of treating the gums to prevent pain and promote healing of the same is effected with application of only a single composition being necessary.

After a detailed research investigation including tests, it has been found that a composition containing the following ingredients gives the best results and has the desired characteristics set forth above:

| Ingredient | Amount |
|---|---|
| Methyl salicylate | 2 to 5 mgms. |
| Benzocaine | 5 to 10 mgms. |
| Thymol iodide | 4 to 8 mgms. |
| Allantoine | 6 to 10 mgms. |
| Gum karaya | 3¼ to 3½ grs. |
| Buffering agent ($NaHCO_3$) | Sufficient to adjust pH to 7.0. |

It can be perceived that the above composition is a dry, relatively fine powder and extensive clinical research has indicated that each application should be approximately 4 grs. in order to give maximum patient comfort with a minimum of applications being necessary. It has also been determined that to obtain maximum wetting of the carrier material such as gum karaya, a small quantity of a surface tension depressant should be added to the composition, the preferred wetting agent being "Duponol C," a product of E. I. du Pont de Nemours & Company and which is known chemically as sodium lauryl sulfate. It is to be understood that other powdered, non-toxic, preferably white wetting agents can be employed, a suitable further example being "Nacconol," a proprietary product of the alkyl aryl sodium sulfonate type.

A denture composition of preferred formulation is as follows:

| Ingredient | Amount |
|---|---|
| Methyl salicylate | 2 mgms. |
| Benzocaine | 8 mgms. |
| Thymol iodide | 4 mgms. |
| Allantoine | 6 mgms. |
| Sodium lauryl sulfate | 5 mgms. |
| Gum karaya | 3½ grs. |
| Buffering agent | Sufficient to adjust pH to 7.0. |

Methyl salicylate is a colorless, liquid oil having a specific gravity of 1.185, a melting point of −8.3° C. and a boiling point of 222.2° C. It is commercially available, absorbed on a finely divided, inert carrier to present a substantially dry product, and it is contemplated in the instant composition that the 2 to 5 mgms. of methyl salicylate utilized be the equivalent weight of the active ingredient, regardless of the quantity of inert carrier. The methyl salicylate in cooperation with the other active ingredients functions as an antiseptic and an analgesic, as well as a flavoring agent to impart a fresh flavor to the preparation.

Benzocaine or ethyl p-amino benzoate, a white, crystalline, odorless, tasteless powder which is only very slightly soluble in water, is the preferred, prolonged, local anesthetic. It is non-irritating, non-toxic and is very slowly absorbed by the tissues of the gums, and therefore, safer for uses in the oral cavity. Benzocaine is relatively fast acting and has a long-lasting effect and although other topical anesthetics could be substituted, it has been determined that benzocaine gives the most effective results at a desired concentration. The benzocaine is particularly effective in alleviating pain as the effect of the Novocain begins to wear off when the present composition is utilized on immediate dentures and also, the topical anesthetic serves to give prolonged relief from pain caused by new dentures pressing on sore areas of relatively healed gums. The effectiveness of the benzocaine is greatly increased when administered in the carrier material, to be more specifically set forth hereinafter, inasmuch as the benzocaine is maintained in maximum contact with the sore area throughout the effective life of the medicament and is not washed away by fluids in the mouth, nor does the same spread as would be the case in an ointment.

Thymol iodide is a bactericidal dusting powder having extremely high germicidal activity and prevents infection of the gums and serves to promote healing of the affected area.

Allantoine, a non-toxic powder, also promotes healing of the gums by virtue of its ability to accelerate cell proliferation, as well as bringing about an increase in flow of neutrophilic leukocytes.

The utilization of gum karaya as the carrier material for the present active medicaments is an extremely important feature of the present invention, inasmuch as the gum serves as a carrier, an adhesive and a cushioning agent, while at the same time maintaining the active components in engagement with the affected area without the same being washed away by fluids in the mouth or spreading out over the entire surface of the oral cavity and in particular, the gums.

Gum karaya is a complex polysaccharide of high molecular weight comprising the dried exudation of the *Sterculia urens* tree and is suitably processed to produce a very fine, white, translucent powder free of contaminants. Powdered gum karaya has a high affinity for water and forms a highly viscous, relatively adhesive sol with liquids such as water.

Although other vegetable gums such as gum tragacanth could be substituted for the gum karaya, the latter has been found to give the best results for the present purposes. A superfine, high grade texture of gum karaya is utilized in order to increase the surface area of the gum available for absorbing water, to thereby assure proper adhesiveness of the composition and to provide a cushion between the prosthetic appliance and the patient's gums. Since gum karaya or other equivalent carrier materials will not spread in the presence of moisture, it can be perceived that the present preparation will remain on the denture exactly in the place where the same is applied and will not spread over the entire surface of the denture and thereby the gums as is the case with heretofore utilized ointments and similar therapeutics.

The manner in which the composition forming the subject matter of the instant invention is applied to the dentures is an important aspect of the present composition and the method of utilizing the same. The dry powdered composition is preferably packaged in a relatively small, flexible insufflator having an extremely small outlet orifice so that the powdered preparation may be applied to only that portion of a new denture normally engaging the sore area of the gums. Thus, only the afflicted area of the gums need be treated and the entire surfaces of the patient's gums are not anesthetized as is the case with prior ointments which have been described. The patient knows exactly where the sore area is and he applies the present composition to only that part of the denture normally pressing against the sensitive area.

By the same token, the instant composition may also be utilized for immediate dentures by applying the powder to all portions of the appliance which engage the gums. In this case, the active components serve to eliminate pain as well as promote healing during the critical period in which the phosthetic device must be worn in order to assure proper fitting of the same after the gums have returned to normal, and the carrier material operates to maintain the various active medicaments in contacting relationship with the gums and subjects all of the afflicted surfaces to the active ingredients at their maximum concentrations. The carrier prevents fluids contained in the mouth from washing the active medicaments away from the sore areas of the gums and also resists spreading so that the preparation is maintained exactly at the desired area of the gums. It is to be noted that the composition of the present invention is normally utilized for a period of two weeks following extraction of the teeth to assure proper healing of the gums and provide complete patient comfort during such period.

It is to be noted that by utilization of a carrier such as gum karaya, the composition has adhesive properties sufficient to maintain the dentures in firm engagement with the patient's gums. Thus, movement of the dentures with respect to the wearer's gums is prevented and which would tend to increase irritation and cause additional pain. The surface active agent incorporated into the gum increases the degree of wetting of the same and the adhesiveness of the preparation is materially augmented and the powder provides a much greater cushioning effect between the denture and the gums.

The wetting agent aids the saturation of the carrier material in that it assures maximum absorption of water. Inasmuch as the gum karaya is not water soluble, the high absorption affinity of the gum for water causes an unusually large proportion of the same to be retained within the carrier throughout the time the composition is positioned between the denture and the patient's gums, and maximum effect of the active ingredients is obtained without spreading of the preparation.

A further important advantage of the present denture powder is the fact that it provides temporary relief for immediate and new dentures but does not operate to cause the patient to depend upon the powder entirely and thereby not visit the dentist when the same is necessary in order to permanently overcome the condition. For example, if the dental appliance does not conform exactly with the patient's gums and the imperfection causes a sore spot in the gums, the present preparation provides temporary patient comfort until he can have the denture permanently repaired or altered by the dentist. Many times the denture fits well, but pressure on the gums causes a sensitive area because a certain portion of the gums has not properly healed after extraction, and the present composition provides relief until the patient can visit the dentist to have the denture corrected.

The denture powder serves the additional function when utilized with immediate dentures, of absorbing a quantity of blood and lymph discharged from the open wounds of the gums and tends to prevent such fluids from sticking to the denture, as has heretofore been experienced. Sometimes it was necessary for the patient to return to the dentist to have the dentures removed because of the blood and lymph cementing the plate to the wearer's gums. This problem has been substantially overcome by the instant composition because all such fluids are absorbed by the powdered material, thereby precluding coagulation and subsequent sticking of the body fluids to the appliance.

The denture composition described herein operates to eliminate "denture breath" commonly associated with artificial dentures, particularly during the healing stages of the gums, because of the inhibition of mouth bacteria by the active ingredients incorporated into the powdered material.

Having thus described the invention what is claimed as new and desired to be secured by Letters Patent is:

1. A method for permitting a patient to retain an immediate denture within his mouth in required firm contacting relationship with a respective gum area and with relative comfort during the critical period immediately following extraction of teeth from said area of the patient's gums, said method comprising the steps of applying a layer of a dry, powdered, topical composition to at least those surfaces of an immediate denture adapted to complementally engage and conform to the painful areas of the patient's gums, said composition including as active ingredients, mutually cooperable, medically effective, non-toxic proportions of methyl salicylate, benzocaine, thymol iodide and allantoin incorporated into a sufficient quantity of gum karaya to serve as an adhesive, cushioning agent and as a material to prevent substantial spread of the composition while interposed between said immediate denture and said area of the patient's gums and thereby subjected to moist conditions; and then placing the denture in the patient's mouth substantially immediately after extraction of said teeth and with said surfaces of the denture in firm contacting relationship with said area of the patient's gums.

2. A method as set forth in claim 1 wherein said composition includes a non-toxic, powdered, surface active agent.

3. A method as set forth in claim 1 wherein a predetermined amount of said composition is applied to said surfaces of the denture and including from about 2 to approximately 5 mgms. of said methyl salicylate, about 5 to approximately 10 mgm. of benzocaine, about 4 to approximately 6 mgms. of allantoin and from about 3¼ to approximately 3½ grs. of gum karaya.

4. A method as set forth in claim 1 wherein said composition comprises by weight from about 2 to approximately 5 parts of methyl salicylate, from about 5 to approximately 10 parts of benzocaine, from about 4 to approximately 8 parts of thymol iodide, from about 6 to approximately 10 parts of allantoin and from about 210 to approximately 226 parts of gum karaya.

5. A method as set forth in claim 1 wherein is included the step of moistening said surfaces of the immediate denture prior to placement of said composition thereon.

6. A method as set forth in claim 5 wherein said composition includes by weight, approximately 5 parts of methyl salicylate, 8 parts of benzocaine, 4 parts of thymol iodide, 6 parts of allantoin, 5 parts of sodium lauryl sulfate and 226 parts of gum karaya.

References Cited in the file of this patent

UNITED STATES PATENTS

| | | |
|---|---|---|
| 2,361,161 | Anderson | Oct. 24, 1944 |
| 2,628,182 | Reasenberg | Feb. 10, 1953 |
| 2,697,060 | Sherman | Dec. 14, 1954 |

OTHER REFERENCES

Drug and Cos. Ind., July 1946, p. 133.
Drug and Cos. Ind., September 1950, p. 386.
U.S. Dispensatory, Osol-Farrar, 25th ed., 1955, p. 1536.